United States Patent
Kodimer et al.

(10) Patent No.: US 7,478,421 B2
(45) Date of Patent: Jan. 13, 2009

(54) SYSTEM AND METHOD FOR ROLE BASED ACCESS CONTROL OF A DOCUMENT PROCESSING DEVICE

(75) Inventors: Marianne L. Kodimer, Huntington Beach, CA (US); Mike Yeung, Mission Viejo, CA (US); Amir Shahindoust, Laguna Niguel, CA (US); Girish R. Krishna, Torrance, CA (US)

(73) Assignees: Toshiba Corporation (JP); Toshiba Tec Kabushiki Kaisha (JP)

( * ) Notice: Subject to any disclaimer, the term of this patent is extended or adjusted under 35 U.S.C. 154(b) by 740 days.

(21) Appl. No.: 10/771,584

(22) Filed: Feb. 4, 2004

(65) Prior Publication Data

US 2005/0172151 A1  Aug. 4, 2005

(51) Int. Cl.
| | |
|---|---|
| H04L 9/00 | (2006.01) |
| H04L 9/32 | (2006.01) |
| G06F 15/16 | (2006.01) |
| G06F 17/30 | (2006.01) |
| G06K 19/00 | (2006.01) |
| G06F 7/04 | (2006.01) |
| G06F 12/14 | (2006.01) |
| G06F 13/00 | (2006.01) |

(52) U.S. Cl. .................. 726/4; 726/5; 726/16; 726/17; 726/27; 713/166
(58) Field of Classification Search .................. None
See application file for complete search history.

(56) References Cited

U.S. PATENT DOCUMENTS 5,757,916 A * 5/1998 MacDoran et al. .......... 380/258
5,911,143 A    6/1999 Deinhart et al.
5,923,756 A * 7/1999 Shambroom ................ 713/156

(Continued)

FOREIGN PATENT DOCUMENTS

EP    1 248 178    10/2002

(Continued)

OTHER PUBLICATIONS

Dridi, Fredj. Neumann, Gustaf. "Towards Access Control for Logical Document Structures". Pub. 1998. Ninth International Workshop on Database and Expert Systems Applications. Relevant pp. 322-327. Found on the World Wide Web at: http://ieeexplore.ieee.org/stamp/stamp.jsp?arnumber=707420&isnumber=15304.*

(Continued)

Primary Examiner—Christopher A Revak
Assistant Examiner—Jeremiah Avery
(74) Attorney, Agent, or Firm—Tucker Ellis & West LLP

(57) ABSTRACT

A system and method for controlling access to a document processing device based on roles assigned to user groups. Each group of users has certain functions for which they are authorized to use the document processing device. The device compares a username and password with correlating information stored in an authentication server. The server transmits a list of functions for which the user is authorized to employ the device. The device then compares the requested function with the authorized functions to determine if the user is allowed to utilize the document processing device for the requested function. The document processing device then performs the authorized requested function.

12 Claims, 3 Drawing Sheets

U.S. PATENT DOCUMENTS

| | | | |
|---|---|---|---|
| 5,925,126 | A | 7/1999 | Hsieh |
| 6,023,765 | A | 2/2000 | Kuhn |
| 6,055,637 | A | 4/2000 | Hudson et al. |
| 6,161,139 | A | 12/2000 | Win et al. |
| 6,182,142 | B1 | 1/2001 | Win et al. |
| 6,202,066 | B1 | 3/2001 | Barkley et al. |
| 6,357,010 | B1 | 3/2002 | Viets et al. |
| 6,453,353 | B1 | 9/2002 | Win et al. |
| 6,487,583 | B1 * | 11/2002 | Harvey et al. ............... 709/204 |
| 6,516,416 | B2 * | 2/2003 | Gregg et al. .................... 726/8 |
| 6,519,647 | B1 | 2/2003 | Howard et al. |
| 6,574,736 | B1 | 6/2003 | Andrews |
| 6,671,818 | B1 * | 12/2003 | Mikurak ........................ 714/4 |
| 6,785,812 | B1 * | 8/2004 | Botham et al. ............. 713/168 |
| 7,062,781 | B2 * | 6/2006 | Shambroom ................. 726/10 |
| 7,127,524 | B1 * | 10/2006 | Renda et al. ................ 709/245 |
| 7,155,616 | B1 * | 12/2006 | Hamlin ....................... 713/193 |
| 7,313,699 | B2 * | 12/2007 | Koga .......................... 713/170 |
| 2001/0017700 | A1 | 8/2001 | Homma |
| 2002/0026592 | A1 | 2/2002 | Gavrila et al. |
| 2002/0062451 | A1 | 5/2002 | Scheidt et al. |
| 2002/0095571 | A1 | 7/2002 | Bradee |
| 2002/0144142 | A1 | 10/2002 | Shohat |
| 2002/0147801 | A1 | 10/2002 | Gullotta et al. |
| 2002/0156904 | A1 | 10/2002 | Gullotta et al. |
| 2002/0188869 | A1 | 12/2002 | Patrick |
| 2003/0046586 | A1 * | 3/2003 | Bheemarasetti et al. ..... 713/201 |
| 2003/0088786 | A1 | 5/2003 | Moran et al. |
| 2003/0093298 | A1 * | 5/2003 | Hernandez et al. ............. 705/2 |
| 2003/0144901 | A1 | 7/2003 | Coulter et al. |
| 2003/0163707 | A1 | 8/2003 | Shigeeda |
| 2003/0177376 | A1 | 9/2003 | Arce Velleggia et al. |
| 2003/0187993 | A1 | 10/2003 | Ribot |
| 2003/0200436 | A1 | 10/2003 | Eun et al. |
| 2003/0233431 | A1 | 12/2003 | Reddy et al. |
| 2004/0025052 | A1 * | 2/2004 | Dickenson .................. 713/201 |

FOREIGN PATENT DOCUMENTS

| | | |
|---|---|---|
| EP | 1 480 104 A2 | 11/2004 |
| GB | 2 331 820 A | 6/1999 |
| JP | 2000232567 | 8/2000 |

OTHER PUBLICATIONS

XP-002268497.

XP-002328353, Canon Developer Support Site.

"The eCopy Solution," Online! 2002, XP002268497, Internet Article retrieved from URL: http://web.archive.org/web/20010604091806/. www.ecopy.com/news/05_01_2001.htm, pp. 4-12.

* cited by examiner

SYSTEM AND METHOD FOR ROLE BASED ACCESS CONTROL OF A DOCUMENT PROCESSING DEVICE

BACKGROUND OF THE INVENTION

This invention is directed to a system and method for role based access control of a document processing device, such as a multifunctional peripheral. More particularly, this invention is directed to system and method for role based access control of a document processing device which provides improved security to the users for managing document processing jobs.

Document processing devices, such as multifunctional peripherals, printing devices, copying devices, facsimiles, or scanning devices, typically provide minimal security to users of such devices for managing document processing jobs. For example, in currently available document processing devices, a user is able to walk up to the document processing device and delete other document processing jobs and place the user's job higher in the queue for processing. Another problem is that when a user selects a private document processing job, which are those jobs that have been created and left in the queue to be released once the user presents his password, the user selecting the private job is able to view the other private jobs in the queue, defeating the purpose of a private document processing job.

Several available document processing devices have attempted to overcome these problems in different ways. One device uses a feature to track and control the access of their peripherals. In this technique, there are 2000 to 2500 user accounts with unique PINS. The user must enter PINS in job control panel to obtain access to the copy function. The drawback of this approach is that only the copy function is protected in the device. This approach also does not support the matrix functionality of roles vs. the functions.

Another device uses a feature wherein the mailboxes are protected by a password. Upon the successful presentation of the password anyone can access the document. However, these devices have various drawbacks as described above. Thus there is a need for a system and method for role based access control of document processing devices which prevents users from performing functions which the users are not allowed to perform.

SUMMARY OF THE INVENTION

In accordance with the present invention, there is provided a system and method for role based access control of document processing devices.

Further, in accordance with the present invention, there is provided a system and method for role based access control of document processing devices which prevents users from performing functions which the users are not allowed to perform.

Further, in accordance with the present invention, there is provided a system and method for role based access control of document processing devices which provides improved security to the users for managing document processing jobs.

Still further, in accordance with the present invention, there is provided a system for role-based access control of a document processing device. The system comprises means adapted for acquiring user data representative of an identity of a user of a document processing device, means adapted to receive device access data representative of device access privileges associated with each of a plurality of users, and comparison means adapted for comparing user data with the device access data. The system also comprises means adapted for generating permission matrix data as a result of a comparison of the comparison means, the permission matrix data including data representative of allowable usage of the document processing device by a user associated with the user data and means adapted for communicating the permission matrix data to the document processing device to allow for control thereof.

Still further, in accordance with the present invention, there is provided a method for role-based control of a document processing device. The method comprises the steps of acquiring user data representative of an identity of a user of a document processing device, receiving device access data representative of device access privileges associated with each of a plurality of users, and comparing user data with the device access data. The method also comprises the steps of generating permission matrix data as a result of a comparison of the comparison means, the permission matrix data including data representative of allowable usage of the document processing device by a user associated with the user data and communicating the permission matrix data to the document processing device to allow for control thereof.

Still other advantages and aspects of the present invention will become readily apparent to those skilled in this art from the following description wherein there is shown and described a preferred embodiment of this invention, simply by way of illustration of one of the modes best suited for to carry out the invention. As it will be realized, the invention is capable of other different embodiments and its several details are capable of modifications in various obvious aspects all without from the invention. Accordingly, the drawing and descriptions will be regarded as illustrative in nature and not as restrictive.

BRIEF DESCRIPTION OF THE DRAWINGS

The accompanying drawings incorporated in and forming a part of the specification, illustrates several aspects of the present invention, and together with the description serve to explain the principles of the invention. In the drawings.

DETAILED DESCRIPTION OF THE PREFERRED EMBODIMENTS

Throughout this description, the preferred embodiment and examples shown should be considered as exemplars, rather than limitations, of the present invention. This invention is directed to a system and method for role based access control of a document processing device. More particularly, this invention is directed to a system and method of controlling who, among a wide variety of users, have access to the functions available on a typical document processing device. For example, an administrator may have authorization to use every function provided by the document processing device, whereas a secretarial user may have limited use of the functions provided by the document processing device.

Figure 1:
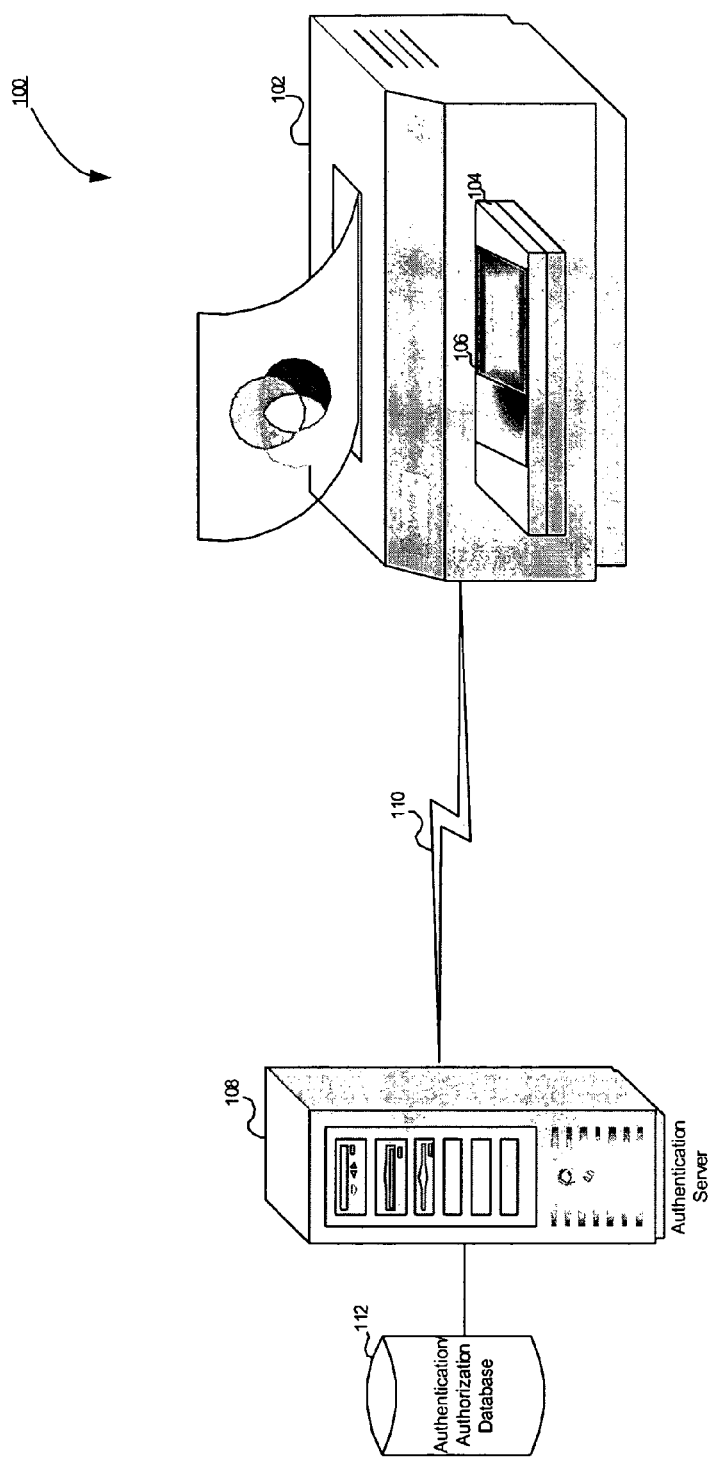
FIG. 1 is diagram illustrating the system according to the present invention.

FIG. 1 is a diagram illustrating a preferred system 100 according to the present invention. The system includes a document processing device 102. Such document processing device 102 is suitably a multifunctional peripheral device, copying machine, facsimile, scanning device, printing device, storage device, or workstation or terminal. The document processing device 102 includes a controller 104 for controlling the operations of the document processing device 102. The controller 104 may be incorporated within the document processing device 102, as shown, or may be an external component. The controller 104 further includes a user interface 106 which allows the user to select the function of the document processing device 102, as well as input the user's identification or username and password, as discussed below.

The document processing device 102 is suitably connected to at least one server 108 via a communications link 110. The server 108 is preferably an authentication server. The server 108 includes a storage area or authentication database 112 for storing selected information, passwords and usernames or the like.

The subject system is particularly advantageous in office document processing environments, and will be described in reference thereto. It is to be appreciated that the subject system is advantageously used in connection with any distributed, information processing environment in which enhanced throughput and efficiency is desired.

Figure 2:
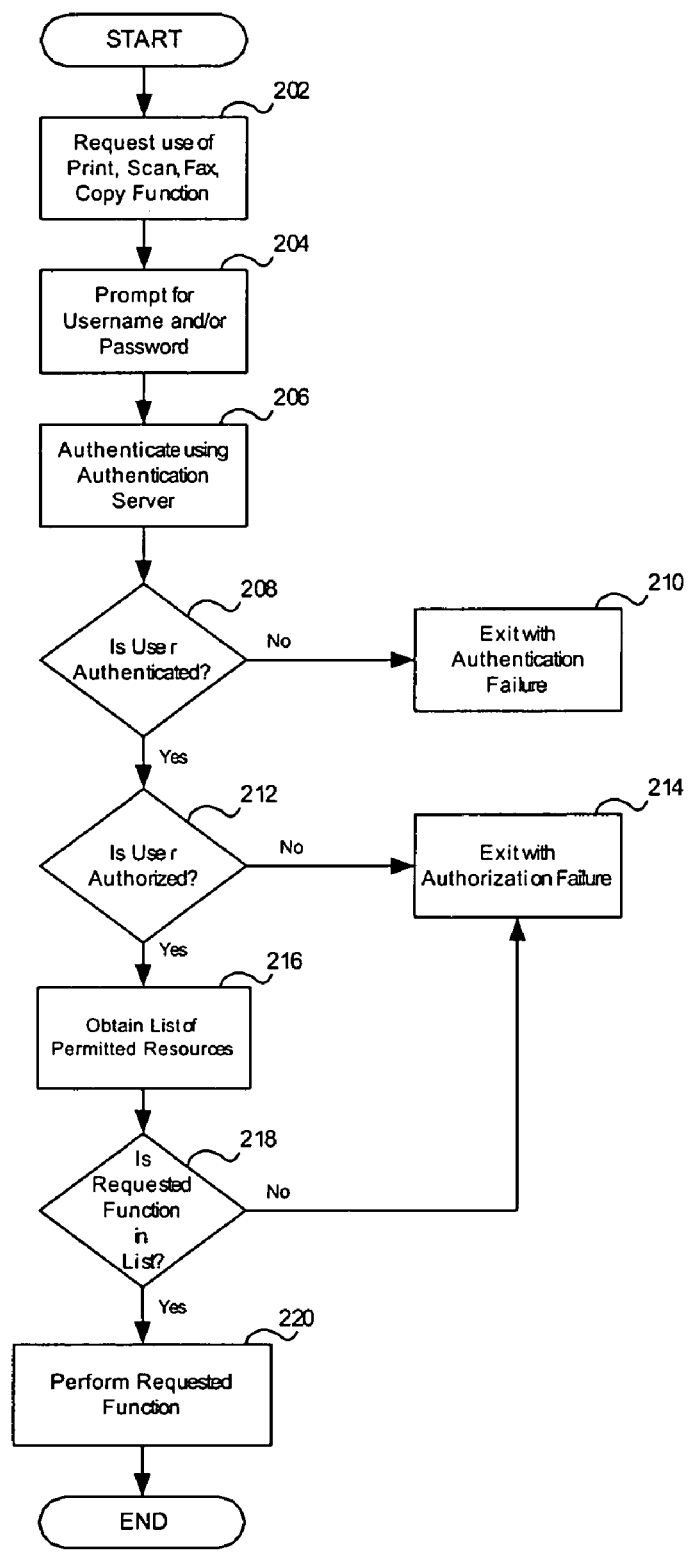
FIG. 2 is a flow chart illustrating the method according to the present invention.

A flowchart illustrating the method according to the present invention is shown in FIG. 2. An associated user requests the use of the document processing device 102 to perform any of functions the document processing device 102 is capable of performing at step 202. The preferred embodiment utilizes the print, scan, facsimile, and copy functions of a multifunction peripheral device, however it will be appreciated by those skilled in the art that other functions may be attributed to the multifunction peripheral device. Further, the skilled artisan will understand that devices, other than the multifunction peripheral device, may equally provide a user with the ability to process documents. The user may request the performance of the function from a remote workstation, mobile device, wireless network client, or other electronic device capable of transmitting the document for processing. Alternatively, the user may physically approach the document processing device 102 and utilize the integral user interface 106, which may or may not be a graphical user interface.

In either situation, the user, after requesting the desired function at step 202, is prompted by the document processing device 102 at step 204 for the user's username and/or password. The inputted username and password are then compared with the corresponding pair of username and password stored on an authentication server 108 at 206. The authentication server 108 may be internal to the document processing device 102, or may be remotely accessible by the document processing device 102 over the communications link 110. The communications link 110 may be any form of wired or wireless communication methods known in the art. The authentication server 108 then informs the controller 104 that the user is authenticated. At 208, the controller 104 must determine that the user has been authenticated. In the event that the user improperly typed in the username or password, the controller 104 will interpret this to be an unauthenticated user and proceed to step 210, wherein the authentication fails and the user is exited from the system.

Returning to step 208, once the controller 104 has received the authentication information from the authentication server 108 and determined that the user is authenticated to use the document processing device 102, the authorization level of the authenticated user must be determined at step 212. The user, prior to using the functions of the document processing device 102, must first be authorized to use such functions as the user's role allows. For example, an authenticated user is determined by the system to be a senior administrator. Correspondingly, the senior administrator will be authorized to use a substantially larger number of functions than a summer intern. In the event that the user is determined at step 212 to lack authorization to use the document processing device 102 or the failure of the system to authorize the user, the controller 104 will exit the user from the system at 214.

When the user is authorized to use the document processing device 102 at 212, the level of such authorization must be determined. At step 216, a list of resources the user is authorized to utilize is transmitted to the controller 104 from the authentication server 108. The list of resources provides the controller 104 with a function-by-function authorization for the user or the group in which the user belongs. For example, the user may be authorized to scan, copy and print, but not be authorized to use the facsimile function. The list returned to the controller 104 contains the functions scan, copy and print, but does not contain the facsimile function, thus the user is not authorized to use that particular function of the document processing device 102. One skilled in the art will appreciate that the preceding example need not be limited to those functions stated, but rather may include numerous other functions.

The controller 104 on the document processing device 102 then compares the list of permitted functions retrieved at step 216 with the request input by the user at step 202 for compatibility. At step 218, the controller 104 then determines the requested function is not on the list of permitted functions for this particular user or the group to which the user belongs. The controller 104 then terminates the request at step 214 and the user is exited for authorization failure. When, at step 218, the controller 104 determines that the requested function from step 202 is contained within the list of authorized functions from step 216, the controller 104 directs the document processing device 102 to perform the function requested at step 220.

Figure 3:
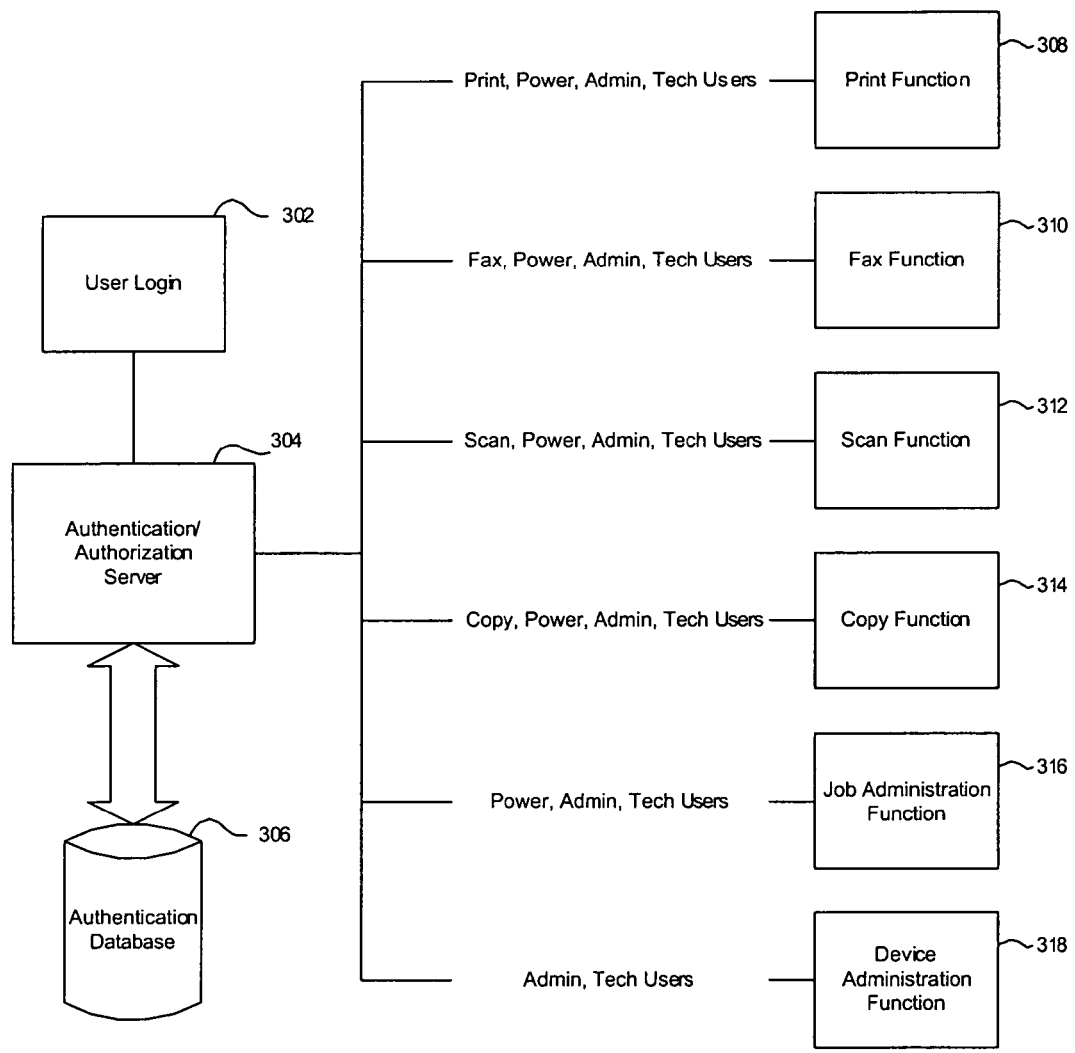
FIG. 3 is a diagram illustrating a preferred role/resource correlation according to the present invention.

Referring now to FIG. 3, there is shown a diagram illustrating a preferred role/resource correlation according to the present invention. One skilled in the art will appreciate that the described allocation of resources is for exemplary purposes only, and should not be used to limit the method described above. A user logs into the controller 104 in order to authenticate and authorize as discussed in the method above, as shown at 302. The login 302 is transmitted to the authentication/authorization server 304 for verification. The server 304 retrieves from the authentication database, shown as 306, the list of authorized functions and authenticated user logins. The authentication/authorization server 304 then correlates the requested function with the functions shown as 308 through 318. It will be appreciated by those skilled in the art that the groups used in this example are created by a system administrator, enabling the administrator to control the level of access each user of the group has with respect to a document processing device 102.

The groups may be configured as determined by the administrator and individual users, depending upon their respective roles, may be members of more than one group. For example, the Print group of users is authorized only to use the print function 308 of the document processing device 102. The Fax group of users is authorized only to use the fax function 310 of the document processing device 102. The Scan group of users is authorized only to use the scan function 312 of the document processing device 102. The Copy group of users is authorized only to use the copy function 314 of the document processing device 102. The Power group of users is authorized to use the print function 308, the fax function 310, the scan function 312, the copy function 314 and the job administration function 316 of the document processing device 102. The Admin group of users is typically comprised of system administrators and is authorized to use all functions 308-318 of the document processing device 102. The Tech group of users typically comprises the technical support personnel charge with maintenance of the document processing device 102 and is authorized to use all of the functions 308-318 supported by the document processing device 102. The correlation described below should not be viewed to limit application of the foregoing method to only these groups.

The diagram of FIG. 3 denotes the six distinct functions capable of being performed by the document processing device 102. The first function is the print function 308. The print function 308 allows the document processing device 102 to act as a printer, printing documents transmitted to it over any communications channel or media known in the art. As shown in FIG. 3, the groups of users designated as Print, Power, Admin, and Tech all have equal rights to use the document processing device 102 as a printer. Each user of these respective groups is capable of sending a print job to the document processing device 102 for printing.

A second set of groups is authorized to us the facsimile function 310. These groups of users are the Fax, Power, Admin and Tech groups of users. Each member of these respective groups is authorized to use the facsimile function 310 of the document processing device 102. Thus, a user belonging to any of these groups may request a document be faxed by the document processing device 102. The third set of groups is authorized to use the scanning function 310 of the document processing device 102. These groups of users are the Scan, Power, Admin and Tech users, with each user authorized to scan a document using the document processing device 102. For example, using the method above, an authenticated user of the Power group may request a document be scanned by the document processing device 102. The controller 104 will then use the method above to determine the user belongs to the Power group and thus has rights to use the scan function 312 of the document processing device 102. The document processing device 102 will then scan the document accordingly.

The fourth set of groups is authorized to use the copy function 314 of the document processing device 102. These user groups are the Copy, Power, Admin and Tech users, with each user capable of requesting the document processing device 102 copy a document. The fifth group of users is authorized to change the administration of print, scanning, copying, or facsimile jobs of the document processing device 102 using the job administration function 316. Thus, users in the Power, Admin and Tech groups may adjust the properties of the job administration of the document processing device 102 by designating, for example, the order in which certain jobs are to be performed by the document processing device 102. The sixth set of user groups is authorized to change the device settings of the document processing device 102 using the device administration function 318. Thus, users belonging to the Admin and Tech groups are authorized to request changes made to the document processing device 102. The skilled artisan will appreciate that the designated groups of users have rights to configure the document processing device 102 settings, layout, hardware, software, and the like. It will be further appreciated that by enabling only certain groups of users to have rights to use certain correlating functions of a document processing device 102, office administration is made considerably easier.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of the ordinary skilled in the art to utilize the invention in various embodiments and with various modifications as are suited to the particular use contemplated. All such modifications and variations are within the scope of the invention as determined by the appended claims when interpreted in accordance to the breadth to which they are fairly, legally and equitably entitled.

What is claimed is:

1. A system for role-based control of a document processing device comprising:

means for receiving an electronic document into a document processing device via an associated network, the document processing device including a printer, a copier, and a scanner;

means for generating a scan file corresponding to a scan of a tangible document by the document processing device;

means for receiving, via the associated network, document processing instruction data corresponding to at least one user-selected document processing operation corresponding to at least one of the received electronic document and a received tangible document;

means for acquiring, via the associated network, user data representative of an identity of a user of a document processing device, which user data is associated with the received electronic document;

means for prompting the user for login data via an interface associated with the document processing device;

means for receiving login data from the user via the interface;

means for receiving device access data representative of device access privileges associated with each of a plurality of users;

comparison means for comparing user data and login data with the device access data;

means for associating login data with at least one preselected user role in accordance with an output of the comparison means;

means for retrieving a permission matrix template specifying allowable usage options of the data processing device associated with each of a plurality of user roles;

means for generating permission matrix data in accordance with the at least one preselected user role and retrieved permission matrix template, the permission matrix data including data representative of allowable usage options of the document processing device from a plurality thereof by a user associated with the user data;

means for communicating the permission matrix data to the document processing device to allow for control thereof;

means for storing the permission matrix on a data storage associated with a controller of the document processing device; and means for controlling operation of the document processing device to a subset of available document processing operations in accordance with the stored permission matrix such that the document processing operation is terminated when not permitted by the stored permission matrix.

2. The system of claim 1 wherein the permission matrix data includes selected permissions associated with at least one of printing, copying, faxing and scanning.

3. The system of claim 2 wherein the permission matrix data includes data allowing access to all available functions when the user data is representative of an administrative mode.

4. The system of claim 1 wherein the user data representative of the identity of a user comprise at least one of user name and user password.

5. The system of claim 1 further comprising:
means for transmitting acquired user data to an authentication server;
means for transmitting device access data to the authentication server; wherein the authentication server compares the user data with the device access data to generate the permission data matrix.

6. The system of claim 1 wherein the user data and the device access data are stored in an associated database.

7. A method for role-based control of a document processing device comprising the steps of:
receiving an electronic document into a document processing device via an associated network, which document processing device includes a printer, a copier, and a scanner;
outputting a tangible rendering of the electronic document by the document processing device;
generating a scan file corresponding to a scan of the tangible document rendered by the document processing device;
receiving, via the associated network, document processing instruction data corresponding to at least one user-selected document processing operation corresponding to at least one of the received electronic document and the received tangible document;
acquiring, via the associated network, user data representative of an identity of a user of a document processing device, which user data is associated with the received electronic document;
prompting the user for login data via an interface associated with the document processing device;
receiving login data from the user via the interface;
receiving device access data representative of device access privileges associated with each of a plurality of users;
comparing user data and login data with the device access data;
associating login data with at least one preselected user role in accordance with an output of the comparison means;
retrieving a permission matrix template specifying allowable usage options of the data processing device associated with each of a plurality of user roles;
generating permission matrix data as a result in accordance with the at least one preselected user role and retrieved permission matrix template, the permission matrix data including data representative of allowable usage options of the document processing device from a plurality thereof by a user associated with the user data;
communicating the permission matrix data to the document processing device to allow for control thereof;
storing the permission matrix on a data storage associated with a controller of the document processing device; and
controlling operation of the document processing device to a subset of available document processing operations in accordance with the stored permission matrix such that the document processing operation is terminated when not permitted by the stored permission matrix.

8. The method of claim 7 wherein the permission matrix data includes selected permissions associated with at least one of printing, copying, faxing and scanning.

9. The method of claim 8 wherein the permission matrix data includes data allowing access to all available functions when the user data is representative of an administrative mode.

10. The method of claim 7 wherein the user data representative of the identity of a user comprise at least one of user name and user password.

11. The method of claim 7 further comprising:
transmitting acquired user data to an authentication server;
transmitting device access data to the authentication server;
wherein the authentication server compares the user data with the device access data to generate the permission data matrix.

12. The method of claim 7 wherein the user data and the device access data are stored in an associated database.

* * * * *